Jan. 24, 1961   N. M. HEBB   2,968,885
DECORATIVE ARTICLE AND METHOD OF PRODUCING THE SAME
Filed Feb. 11, 1959
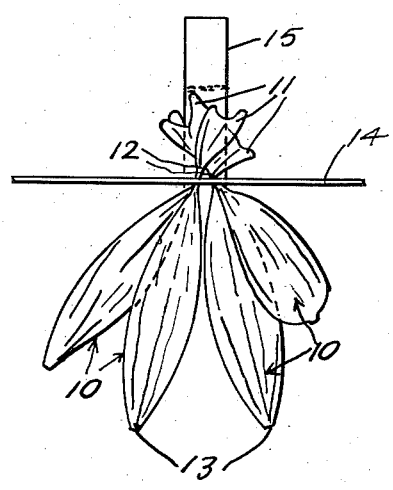
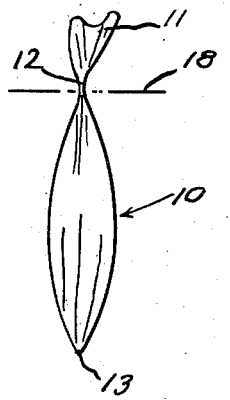
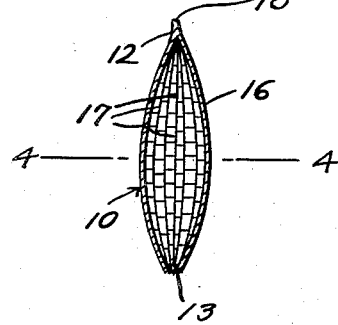
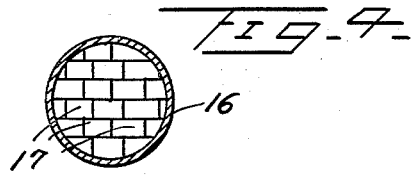
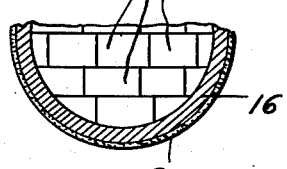
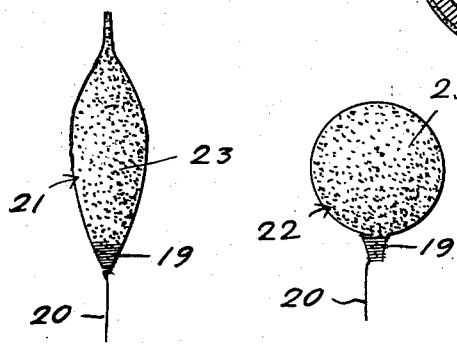
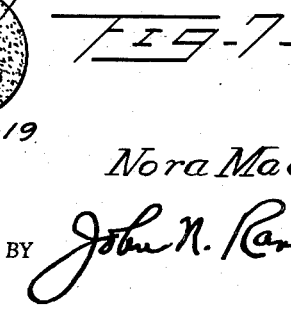
INVENTOR
Nora Mae Hebb
BY
ATTORNEY

United States Patent Office 2,968,885
Patented Jan. 24, 1961

2,968,885

DECORATIVE ARTICLE AND METHOD OF PRODUCING THE SAME

Nora Mae Hebb, 895 S. Orange Ave., Bartow, Fla.

Filed Feb. 11, 1959, Ser. No. 792,510

5 Claims. (Cl. 41—13)

This invention relates to a novel decorative article which is well adapted for use as a floral material in producing artificial floral decorations such as fruits and leaves, or in producing other decorative articles such as bells and balls.

Another object of the invention is to provide a novel method for producing the decorative article from a part of a common plant which grows in abundance in certain areas of this country, so that the cost of producing the article is limited primarily to the labor involved, enabling the articles to be produced and sold at very low cost.

Various other objects and advantages of the invention will hereinafter become more fully apparent from the following description of the drawing, illustrating several forms of the article and the steps involved in producing the article, and wherein:

Figure 1 is an elevational view illustrating one of the initial steps in producing the decorative article;

Figure 2 is an elevational view illustrating another step in the method;

Figure 3 is a longitudinal sectional view of the article as it appears after completion of the step as illustrated in Figure 2;

Figure 4 is a cross sectional view of the partially completed article, taken substantially along a plane as indicated by the line 4—4 of Figure 3;

Figure 5 is an elevational view of one form of the completed decorative article;

Figure 6 is an enlarged fragmentary cross sectional view of the article as shown in Figure 5, and Figure 7 is a view similar to Figure 5 but showing a second design of the completed article.

Referring more specifically to the drawing, Figure 1 illustrates a group of water hyacinth stems 10 and water hyacinth leaves 11, which leaves are attached to the stems by a flattened or restricted neck portion 12.

The water hyacinth (*Eichhornia crassipes*) grows abundantly in certain areas of the United States and is considered a nuisance growth. The water hyacinth plants float on the surface of the water in their normal condition of growth and are supported afloat by the stems 10, each of which constitutes an air-filled float.

In the practice of the novel method to produce novel decorative articles from the stems of water hyacinth plants, stems 10 of a selected size and shape are cut off from the root system of the plants along cut lines 13, as seen in Figures 1, 2 and 3. The stems 10 with their attached leaves 11, after having been thus gathered, are hung up to dry in the shade. This may be accomplished in any suitable manner which does not injure the stems 10, preferably by attaching the leaves 11 to a supporting strand of cord or wire 14, as by means of a spring clip 15 of any conventional construction, or other conventional attaching means. The stems 10 while thus suspended are dried in the shade, the drying time requiring up to four weeks. Since no pressure or forces are exerted on the stem during this drying period, the skin or outer envelope 16 of the stem will not be punctured or damaged and will remain airtight, except for the opening 13, formed by cutting the stem at its root end, and the mass of individual air cells 17, completely filling the interior of the skin or envelope 16, will not be damaged.

After shade drying of the stems 10 has been completed, the stems and leaves are detached from the support 14, 15 and the leaves 11 are carefully cut off at the neck 12 along a line, as indicated by the broken line 18 in Figure 2, so that the upper end of the skin 16 will remain intact and the upper end of the chamber of the stem, as defined by the air cells 17, will remain sealed by the part of the neck 12 which remains attached to the stem 10, as seen in Figure 3. The dried stems 10, as illustrated in Figure 3, can be stored until used in a dry place, so long as the dried stems are not subjected to any pressure tending to collapse the skin or envelope 16 and which would deform any of the air cells 17.

The shapes of the dried expanded stems 10, as illustrated in Figure 3, may be varied to simulate leaves, fruits or other articles such as bells or spheres. This is accomplished by subjecting the dried stems 10 to steam sufficiently to soften the stems. Pressure is then applied to parts of the stem rendered pliable by the steam, to deform or reshape the stem by breaking down or collapsing the air cells 17 in certain portions of the stem to effect a desired alteration in the shape of the stem, as illustrated in Figures 5 and 7. Air from the collapsed part or parts of the stem and from the collapsed air cells 17, is forced out of the stem through its end opening 13. The reshaped stem is then allowed to dry in its reshaped form and which drying action is rapidly accomplished, leaving the stem firm.

Thereafter, an end of a wire, as seen at 19 in Figures 5 and 7, is wound tightly around the open end of the stem for sealing said stem opening 13. The other end 20 of the wire may be extended from the wound portion 19 to form a stem portion or fastening medium for the ornate article thus created from the stem 10. One such article 21 is illustrated in Figure 5 and another such, spherical article 22 is shown in Figure 7.

The articles 21 and 22 are preferably thereafter completely sealed to maintain the articles inflated and the air content thereof intact. This may be accomplished by dipping the articles in wax or paraffin which is heated to a fluent state, or by coating the articles with any commercial sealer, to form an exterior coating 23 completely around the skin or envelope 16 and which will effectively seal said skin and also protect it from being punctured. After the coating 23 is dried and hardened, any desired ornamental finish may be applied thereto.

Various modifications and changes are contemplated and may be resorted to, without departing from the function or scope of the invention as hereinafter defined by the appended claims.

I claim as my invention:

1. A decorative inflated article formed from a dried and reshaped water hyacinth stem, said stem comprising a skin defining an envelope impervious to air having an open end and a mass of air cells contained within said skin, means closing and sealing said open end of the reshaped stem to prevent escape of air from the inflated decorative article, and a coating completely enclosing and sealing said article.

2. A decorative inflated article formed from a dried and reshaped water hyacinth stem, said stem comprising a skin defining an envelope impervious to air having an open end and a mass of air cells contained within said skin, and a strand of wire having one end wound tightly about and sealing the open end of the reshaped stem to prevent escape of air from the inflated decorative article, said strand having an opposite end extending from the wound end and forming a fastening medium for the decorative article.

3. The method of forming a decorative inflated article comprising cutting off the stem and leaf of a water hyacinth plant, the step of drying the stem and leaf, the step of thereafter cutting off the leaf from the stem without forming an opening in the stem end from which the leaf is severed, the step of applying steam to at least a portion of the dried stem to render the steamed part pliable, the step of applying pressure for reshaping the pliable inflated stem portion, the step of drying the reshaped stem, and the step of sealing the severed open end of the stem to retain the entrapped air within the reshaped article.

4. The method as defined by claim 3, consisting of the additional step of applying a sealant for completely enclosing, sealing and protecting the reshaped stem.

5. The method of forming a decorative inflated article from an expanded air-filled plant stem comprising severing the stem and its leaf from the plant at the end of the stem disposed remote from the leaf to form an opening in said stem end, the step of drying the stem and attached leaf, the step of severing the leaf from the dried stem without unsealing the stem end from which the leaf is severed, the step of steaming the dried stem to render it pliable, applying pressure to the pliable inflated stem for partially collapsing and reshaping the stem and for expelling a part of the air content of the stem through the first mentioned open stem end, thereafter drying the reshaped stem, and the step of closing and sealing the open end of the reshaped and dried stem to entrap the air therein to provide a preserved decorative inflated article.

References Cited in the file of this patent

UNITED STATES PATENTS

| | | |
|---|---|---|
| 385,878 | Pettebone | July 10, 1888 |
| 1,412,008 | Koropp et al. | Apr. 4, 1922 |
| 1,484,656 | Koropp et al. | Feb. 26, 1924 |
| 1,661,140 | Nell et al. | Feb. 28, 1928 |
| 1,732,739 | Butcher | Oct. 22, 1929 |
| 1,825,065 | Howell | Sept. 29, 1931 |
| 1,908,922 | Ruzicka | May 16, 1933 |
| 1,962,667 | Moore | June 12, 1934 |
| 1,964,689 | Quillen et al. | June 26, 1934 |
| 1,964,887 | Lovett | July 3, 1934 |
| 2,237,739 | Jones | Apr. 8, 1941 |
| 2,639,553 | Russell | May 26, 1953 |
| 2,906,636 | Hoivik | Sept. 29, 1959 |